(12) United States Patent
von Kries

(10) Patent No.: US 8,662,877 B2
(45) Date of Patent: Mar. 4, 2014

(54) SYSTEM, METHOD AND APPARATUS FOR SOLAR HEATED MANUFACTURING

(76) Inventor: Karl von Kries, Pismo Beach, CA (US)

( * ) Notice: Subject to any disclaimer, the term of this patent is extended or adjusted under 35 U.S.C. 154(b) by 288 days.

(21) Appl. No.: 12/916,066

(22) Filed: Oct. 29, 2010

(65) Prior Publication Data

US 2012/0104658 A1  May 3, 2012

(51) Int. Cl.
*B28B 17/00* (2006.01)
*A01J 21/00* (2006.01)

(52) U.S. Cl.
USPC ............. 425/174.4; 425/174; 425/405.1; 425/435

(58) Field of Classification Search
USPC ............. 425/174, 174.4, 405.1, 435
See application file for complete search history.

(56) References Cited

U.S. PATENT DOCUMENTS

| | | | |
|---|---|---|---|
| 2,168,331 A | 8/1939 | Fields et al. | |
| 2,987,961 A | 6/1961 | Cotton et al. | |
| 3,492,192 A | 1/1970 | Bullard, IV | |
| 3,998,206 A | 12/1976 | Jahn et al. | |
| 4,195,620 A | 4/1980 | Rust et al. | |
| 4,255,221 A | 3/1981 | Young | |
| 4,496,695 A | 1/1985 | Sugio et al. | |
| 4,776,992 A | 10/1988 | Irving et al. | |
| 4,841,946 A | 6/1989 | Marks | |
| 4,929,403 A | 5/1990 | Audsley | |
| 5,100,589 A * | 3/1992 | Ticknor | 264/1.27 |
| 5,565,164 A | 10/1996 | Goehner et al. | |
| 5,667,746 A | 9/1997 | Goehner et al. | |
| 5,753,172 A | 5/1998 | Forrest, Jr. et al. | |
| 6,906,112 B1 | 6/2005 | Wojciak et al. | |
| 7,077,636 B2 | 7/2006 | Anders et al. | |
| 7,081,219 B2 | 7/2006 | Stewart et al. | |
| 7,114,934 B2 | 10/2006 | Biermann et al. | |
| 7,393,493 B2 | 7/2008 | Ashman et al. | |
| 7,744,362 B2 | 6/2010 | Lee | |
| 2001/0050449 A1* | 12/2001 | Baxter | 264/402 |
| 2003/0227107 A1* | 12/2003 | Stewart | 264/236 |
| 2007/0034352 A1* | 2/2007 | Lee | 165/58 |
| 2009/0178668 A1 | 7/2009 | Boggavarapu et al. | |

FOREIGN PATENT DOCUMENTS

| | | |
|---|---|---|
| CA | 2255287 A1 | 11/1998 |
| JP | 40-33605 A | 2/1992 |
| JP | 40-33605 A | 2/1992 |
| WO | WO 2009/039440 A2 | 3/2009 |

OTHER PUBLICATIONS

Vishal Sipani et al., "Photopolymerization of Composites", Recent Developments in Glass-Fiber and Silica-Filled Systems, Radtech Report, May/Jun. 2003, pp. 22-26—http://www.radtech.org/members/member documents/Pages%20from%20MayJun2-3.pdf.

(Continued)

*Primary Examiner* — Milton I Cano
*Assistant Examiner* — Jeremiah Smith
(74) *Attorney, Agent, or Firm* — The Law Offices of Eric W. Peterson

(57) ABSTRACT

A system for a thermal manufacturing system including a heliostat and a mold. The heliostat includes at least one reflecting surface, a steering mechanism and a controller. The steering mechanism is coupled to the at least one reflecting surface and capable of directing at least a first portion of the at least one reflecting surface toward a first one of multiple, selectable focal points. The mold is located in a second one of the selectable focal points. A manufacturing method is also disclosed.

14 Claims, 17 Drawing Sheets

(56) References Cited

OTHER PUBLICATIONS

R. J. Crawford, "Recent Advances in The Manufacture of Plastic Products by Rotomoulding", Journal of Materials Processing Technology, vol. 56, Issues 1-4, Jan. 1996, pp. 263-271—School of Mechanical & Processing Engineering, Queen's University, N. Ireland.

E. Siores, "*Thermoplastic Joining Using Solar Energy Concentrator*", School of Mechanical and Manufacturing Engineering, Swinburne and University of Technology, John Street, Swinburne, Hawthorn, Melbourne, Victoria, Australia, vol. 37, Issue 9, Sep. 1997 (pp. 1273-1279).

Stoynov, et al., "*Joining of Engineering Thermoplastic by Concentrated Beam Isolation*"—*a Feasibility Study*, School of Mechanical, Manufacturing and Medical Engineering, Queensland. University of technology, Brisbane Australia, vol. 138, Issues 1-3, Jul. 20, 2003 (pp. 67-74).

International Search Report—PCT/US2011/053782 dated Feb. 21, 2012 (2 pages).

\* cited by examiner

SYSTEM, METHOD AND APPARATUS FOR SOLAR HEATED MANUFACTURING

BACKGROUND

The present invention relates generally to plastic manufacturing processes, and more particularly, to methods and systems for thermal molding of plastic.

Manufacturing process for plastic products typically includes heating various forms of plastic (e.g., pellets, powders, sheets, etc.) and forming the plastic into the desired shape. Two very common forms of plastic molding are rotational molding and vacuum molding.

Rotational molding includes a hollow mold that can rotate in all three axis (X, Y, Z axis). The hollow mold is typically formed from a metal or similarly heat-conductive material. A quantity of plastic powder is placed inside the hollow mold. The hollow mold is then moved into an oven where the heat source substantially surrounds the hollow mold. The hollow mold is then rotated and heated in the oven.

As the hollow mold is rotated and heated in the oven, the plastic powder continually falls to the bottom of the inner surface of the hollow mold. The heated hollow mold heats the plastic powder on the bottom inner layer of the hollow mold. The melted plastic powder bonds together (e.g., sinters) to form a complete plastic layer in the bottom inner surface of the hollow mold. Continually rotating the mold forms a plastic layer on all inner surfaces of the hollow mold.

The hollow mold can be removed from the oven once the complete plastic layer is formed on the inner surface of the hollow mold. The hollow mold is then allowed to cool and then opened and the molded plastic product removed from the hollow mold.

Typical products formed in a rotational molding system are tanks, boats, shipping containers and other shapes.

Vacuum molding includes a frame for supporting a sheet of rigid plastic over a positive (raised or convex) or a negative (sunken or concave) shaped mold. A heat source is directed at the plastic sheet and a vacuum is applied to the area around and in some instances inside the mold, softening the plastic sheet and making it flexible. The vacuum draws the heated plastic sheet down onto or into the mold to form the desired shape. Then the heat source is removed and the molded plastic sheet is allowed to cool and become ridged again. Then the vacuum is removed and the molded plastic sheet can be removed from the mold.

Typical products formed in a vacuum molding system are boat hulls, showers, shipping trays, and equipment covers.

In both rotational molding systems and vacuum molding systems, the energy cost for the heat portion of the manufacturing process is an ever larger portion of the end product cost. In view of the foregoing, there is a need for lower cost energy sources for both rotational molding systems and vacuum molding systems.

SUMMARY

Broadly speaking, the present invention fills these needs by providing a thermal manufacturing system and method. It should be appreciated that the present invention can be implemented in numerous ways, including as a process, an apparatus, a system, computer readable media, or a device. Several inventive embodiments of the present invention are described below.

One embodiment provides a thermal manufacturing system including a heliostat and a mold. The heliostat includes at least one reflecting surface, a steering mechanism and a controller. The steering mechanism is coupled to the at least one reflecting surface and capable of directing at least a first portion of the at least one reflecting surface toward a first one of multiple, selectable focal points. The mold is located in a second one of the selectable focal points.

The thermal manufacturing system can also include a pressure control source coupled to the mold. The thermal manufacturing system can also include a rotation mechanism coupled to the mold.

The rotation mechanism can be a two axis rotation mechanism. The rotation mechanism can be a continuous rotation mechanism. The rotation mechanism can be a variable rotation rate rotation mechanism. The rotation mechanism can be a selected rotation position mechanism.

The thermal manufacturing system can also include a heat shield structure. The heat shield structure can substantially enclose the mold.

The reflective surfaces can include flat reflective surfaces and/or curved reflective surfaces. The mold can include multiple molds, each one of the molds being located in a corresponding one of the selectable focal points.

The controller can include software and hardware including computer executable logic for loading a quantity of moldable material in a mold, computer executable logic for placing the mold in the selected one of the focal points and computer executable logic for directing reflected, concentrated radiant energy on a selected portion of the mold. The controller can also include software and hardware including computer executable logic for heating the selected portion of the mold with the reflected, concentrated radiant energy, computer executable logic for removing the mold from the focal point of the heliostat and computer executable logic for removing a molded product from the mold.

Another embodiment provides a manufacturing system comprising a mold, a selected rotation position mechanism coupled to the mold, wherein the selected rotation position mechanism is a two axis rotation mechanism, a heliostat including at least one of a plurality of flat reflective surfaces or a plurality of curved reflective surfaces, a selectable focal point, a steering mechanism and a controller.

Another embodiment provides a manufacturing method including loading a quantity of moldable material in a mold, placing the mold in a focal point of a heliostat, directing reflected, concentrated radiant energy on a selected portion of the mold, heating the selected portion of the mold with the reflected, concentrated radiant energy, removing the mold from the focal point of the heliostat and removing a molded product from the mold.

The method can also include rotating the mold. Directing the reflected, concentrated radiant energy on the selected portion of the mold can include directing the reflected, concentrated radiant energy on the selected portion of the mold for a selected time. Removing the mold from the focal point of the heliostat can also include cooling the molded product.

Heating the selected portion of the mold with the reflected, concentrated radiant energy further includes heating the selected portion of the mold until a portion of the quantity of moldable material bonds to form a layer on an inner surface of the mold. The method can also include applying a vacuum to the mold.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for using solar energy in a rotational molding system and in a vacuum molding system and methods thereof will now be described. It will be apparent to those skilled in the art that the present invention may be practiced without some or all of the specific details set forth herein.

Figure 1A:
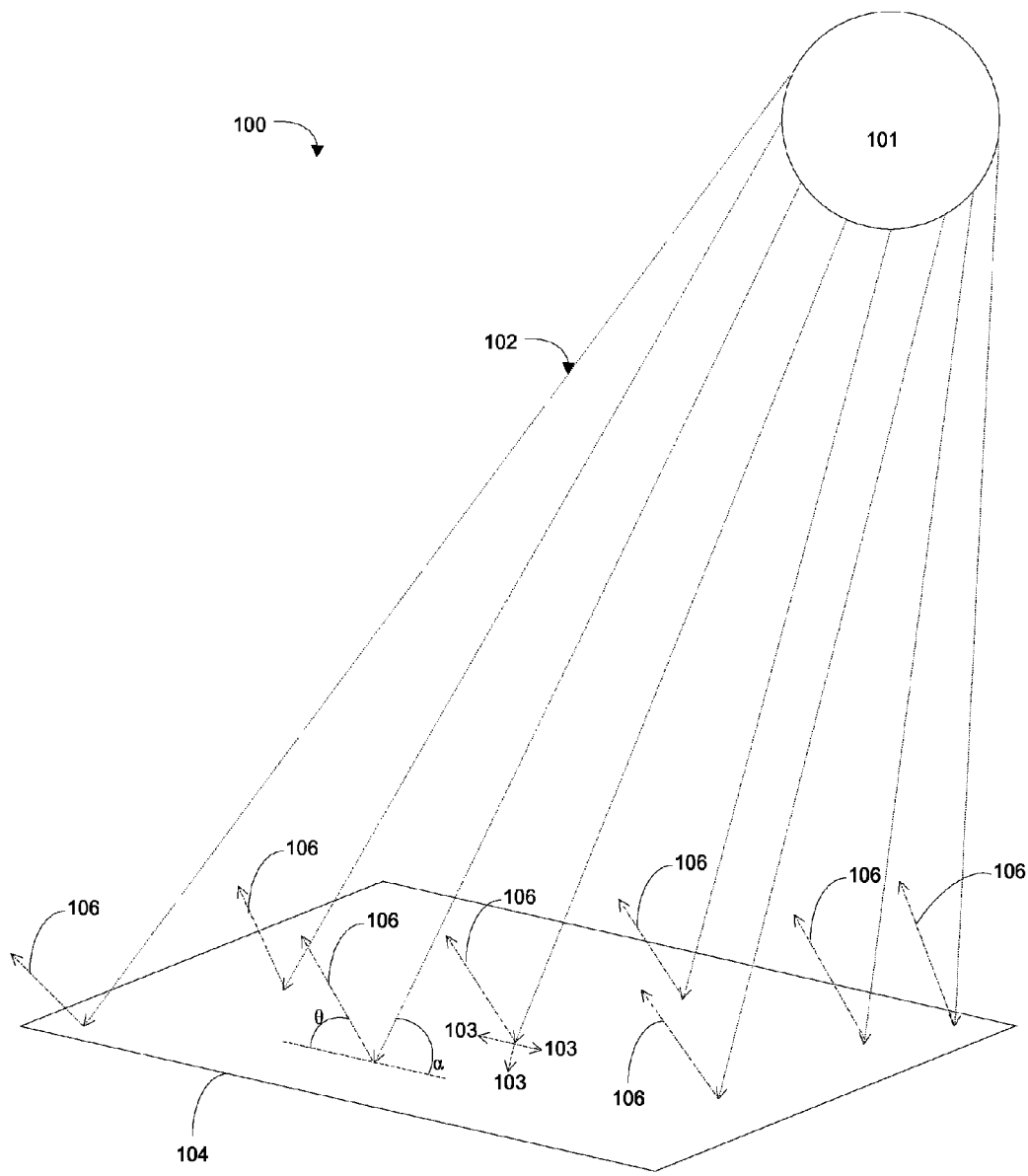
FIG. 1A is a schematic diagram of a flat surface, in accordance with one embodiment of the present invention.

Radiant solar energy is a very versatile energy source. Radiant solar energy can be absorbed directly into the surface the radiant solar energy impinges upon. FIG. 1A is a schematic diagram of a flat surface 104, in accordance with one embodiment of the present invention. Radiant solar energy 102 impinges on the flat surface 104. At least a first portion 106 of the radiant solar energy 102 is reflected off of the flat surface 104. The flat surface 104 can also absorb a second portion 103 of the radiant solar energy 102. The relative quantities of the reflected first portion of the radiant energy 106 and the absorbed second portion of the radiant energy 103 is determined by the types of materials in the flat surface 104 and the surface finish (e.g., reflectivity) of the flat surface 104. Radiant solar energy 102 can be reflected from a reflective surface (e.g., mirror or other reflective surface such as a polished surface).

The reflected first portion of the radiant energy 106 is reflected off of the flat surface 104 at an angle $\theta$ corresponding to the incident angle $\alpha$ of the radiant solar energy 102. As a result the reflected first portion 106 is reflected off of the flat surface 104 in a dispersed fashion as the reflected first portion 106 is reflected in different angles corresponding to the different incident angles.

Figure 1B:
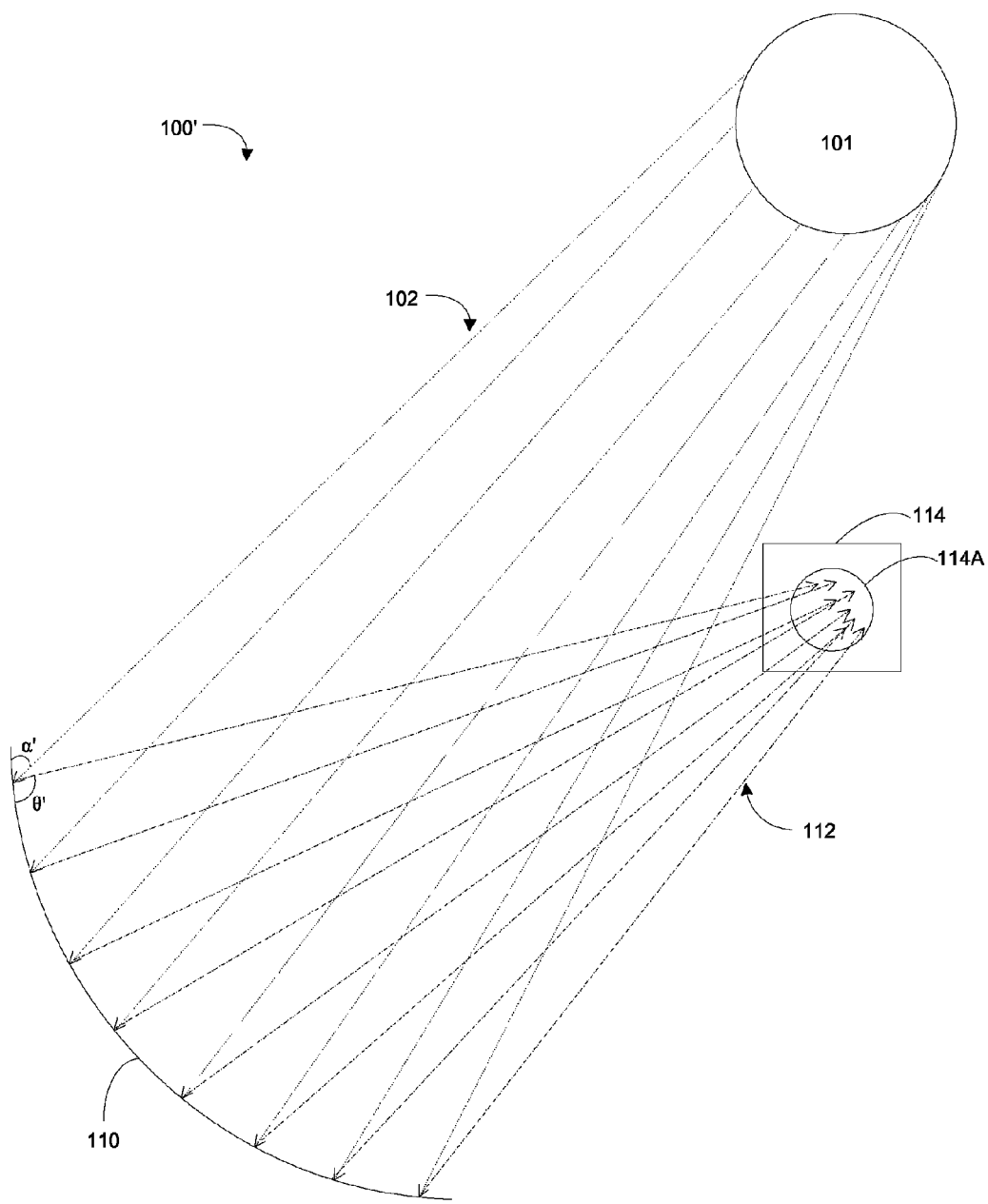
FIG. 1B is a schematic of a single curved reflective surface, in accordance with one embodiment of the present invention.

FIG. 1B is a schematic of a single curved reflective surface 110, in accordance with one embodiment of the present invention. A curved reflective surface 110 can focus or concentrate the reflected radiant energy 112. The reflected radiant energy 112 is reflected off of the curved surface 110 at an angle $\theta'$ corresponding to the incident angle $\alpha'$ of the radiant solar energy 102 at the corresponding point on the curved surface. As a result, the reflected radiant energy 112 from the entire area of the curved surface 110 can be directed onto a selected or even a smaller area or focal point 114A on a target 114. The focal point 114A on the target 114 can have an area less than the area of the curved surface 110, thus the curved surface can concentrate the reflected radiant energy 112 on the focal point 114A on the target 114.

Figure 1C:
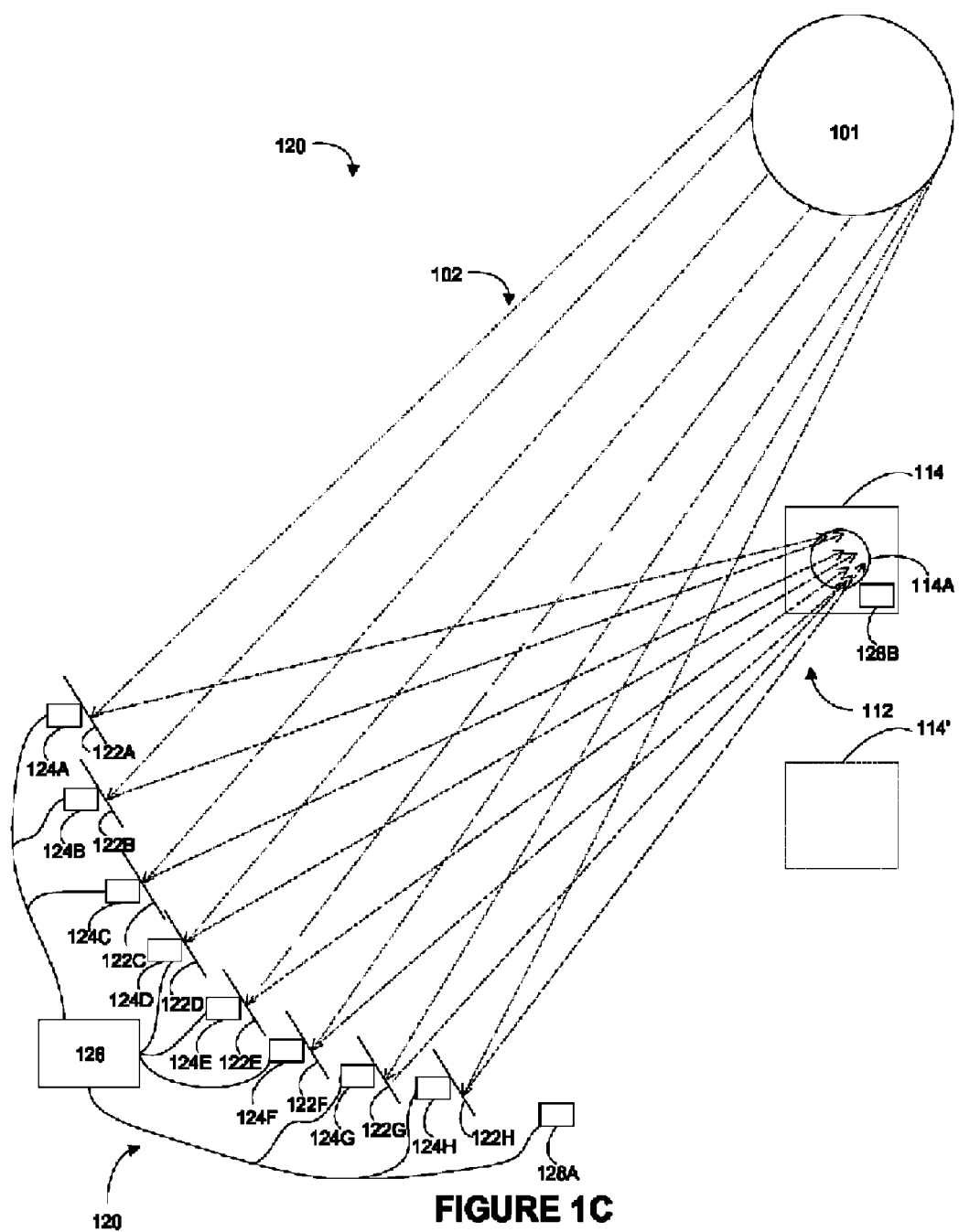
FIG. 1C is a schematic diagram of a heliostat system, in accordance with one embodiment of the present invention.
Figure 1D:
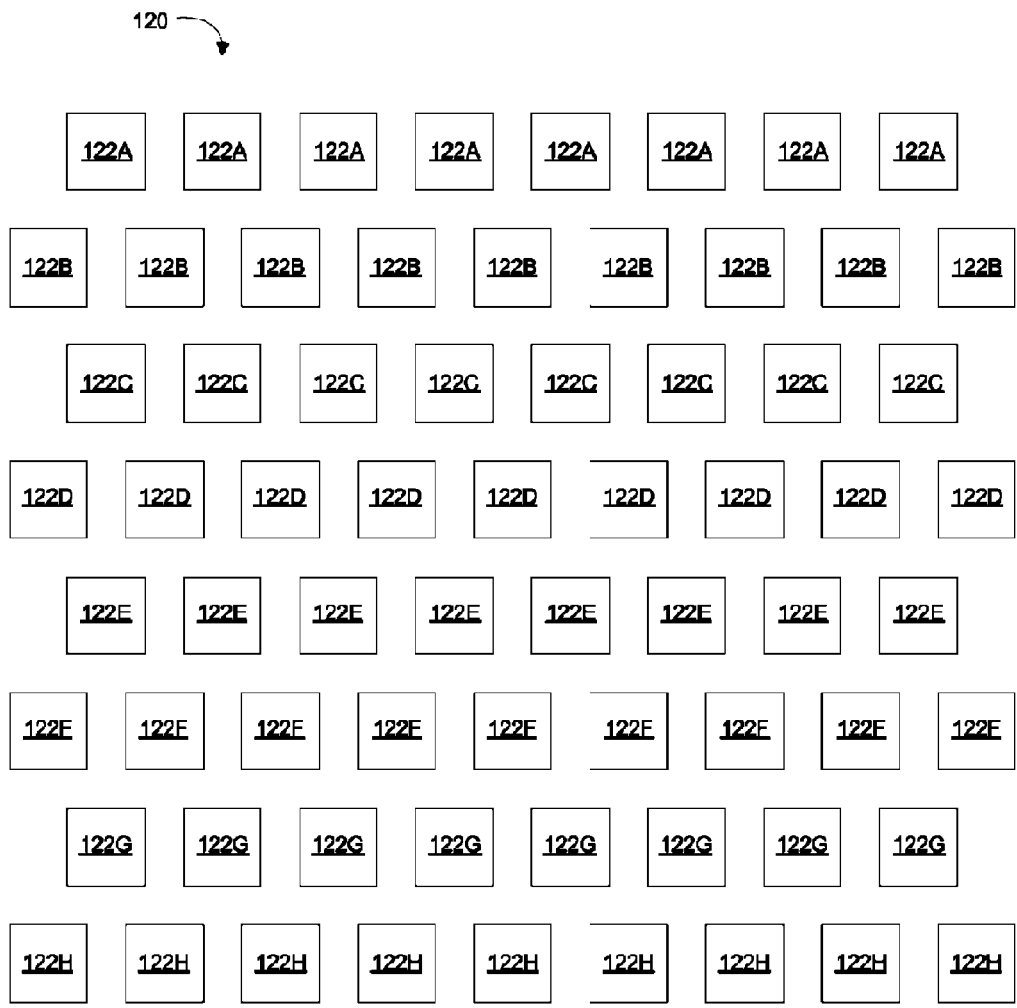
FIG. 1D is a schematic diagram of an array of reflective surfaces in a heliostat system, in accordance with one embodiment of the present invention.

FIG. 1C is a schematic diagram of a heliostat system 120, in accordance with one embodiment of the present invention. FIG. 1D is a schematic diagram of an array of reflective surfaces 122A-H in a heliostat system 120, in accordance with one embodiment of the present invention. The heliostat system 120 includes multiple flat or curved reflective surfaces 122A-H. The reflective surfaces 122A-H are coupled to one or more motors 124A-H. The motors 124A-H are coupled to a heliostat controller 126. The heliostat controller 126 can control the motors 124A-H to steer or otherwise move selective ones of the reflective surfaces 122A-H so that a portion of the incident radiant energy 102 is reflected radiant energy 112 and is directed toward and, optionally concentrated on the target 114. The heliostat controller 126 can selectively steer each of the reflective surfaces 122A-H individually or in combination. The reflective surfaces 122A-H can concentrate the reflected radiant energy 112 on the focal point 114A on the target 114.

Figure 1E:
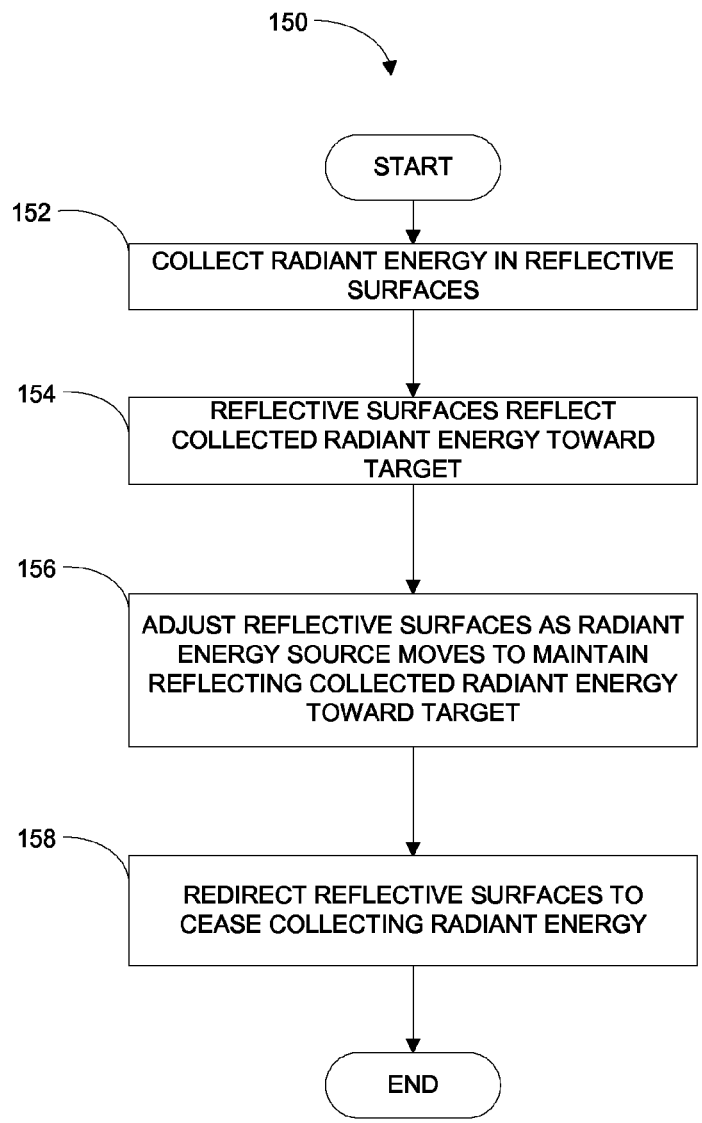
FIG. 1E is a flowchart diagram that illustrates the method operations performed in directing the reflected radiant energy with a heliostat, in accordance with one embodiment of the present invention.

FIG. 1E is a flowchart diagram that illustrates the method operations 150 performed in directing the reflected radiant energy 112 with a heliostat 120, in accordance with one embodiment of the present invention. The operations illustrated herein are by way of example, as it should be understood that some operations may have sub-operations and in other instances, certain operations described herein may not be included in the illustrated operations. It should be understood that some operations may be enabled in computer readable software and logic. With this in mind, the method and operations 150 will now be described. In an operation 152, the radiant energy 102 is collected in one or more of the reflective surfaces 122A-H of a heliostat such as shown in FIG. 1C above.

In an operation 154, the heliostat controller 126 steers selective ones of the reflective surfaces 122A-H so that the collected, reflected radiant energy 112 is directed toward and, optionally concentrated a focal point 114A on the target 114. The controller 126 can selectively steer each of the reflective surfaces 122A-H individually or in combination by activating and controlling the respective motors 124A-H. The heliostat controller 126 can include controlling software and logic for activating and controlling the motors 124A-H.

The heliostat controller 126 can selectively steer each of the reflective surfaces 122A-H individually or in combination as needed to achieve a desired temperature and/or concentration of the reflected energy 112 on the target 114. Controlling the temperature on the target 114 can include increasing or decreasing the number of reflective surfaces 122A-H and/or increasing or decreasing the concentration of the collected, reflected radiant energy 112 on the target 114. Increasing or decreasing the concentration of the collected, reflected radiant energy 112 can include directing the reflected radiant energy on a focal point 114A with a larger or a smaller area on the target 114.

By way of example, the focal point 114A can be very small and directed to a very precise location on the surface of the target. Alternatively, the focal point 114A can be somewhat larger and only a portion of the focal point 114A might impinge on the surface of the target 114. In yet another alternative, the focal point 114A could have an area larger than the surface of the target 114.

In an operation 156, the heliostat controller 126 automatically tracks the radiant energy source 101 (e.g., the sun) as it moves, or changes in intensity relative to the heliostat 120 to maintain the reflected radiant energy 112 is directed toward the desired focal point 114A. The heliostat controller 126 can include software and/or logic 126A that automatically tracks the movement of the sun 101. The radiant energy source 101 can change in intensity due to interference such as clouds, dust, smoke, haze or other interference between the source and the heliostat 120. a larger number or a small number of reflective surfaces 112A-H can be used to adjust and/or maintain the intensity of the reflected energy 112.

The heliostat 120 can also include various sensors 128A, 128B for detecting the location and intensity of the radiant energy source 101, the location of the target 114 and the location and size of the focal point 114A. The sensors 128A, 128B can detect radiant energy at any desired wavelength (e.g., infrared, visible, ultraviolet, etc.) and are coupled to the heliostat controller 126. Sensors 128A, 128B can also be used to monitor the concentration of the reflected radiant energy 112 on the larger or a smaller area 114A on the target 114. The sensors 128A, 128B can also be used to monitor the temperature of the target 114.

In an operation 158, the heliostat controller 126 directs the reflective surfaces 122A-H away from the target 114 and the method operations can end. The heliostat controller 126 can direct the reflective surfaces 122A-H such that the reflected radiant energy 112 is reflected in various different directions. Alternatively, the target 114, can be moved to second location 114', away from the focal point 114A of the collected, reflected radiant energy 112.

Figure 2A:
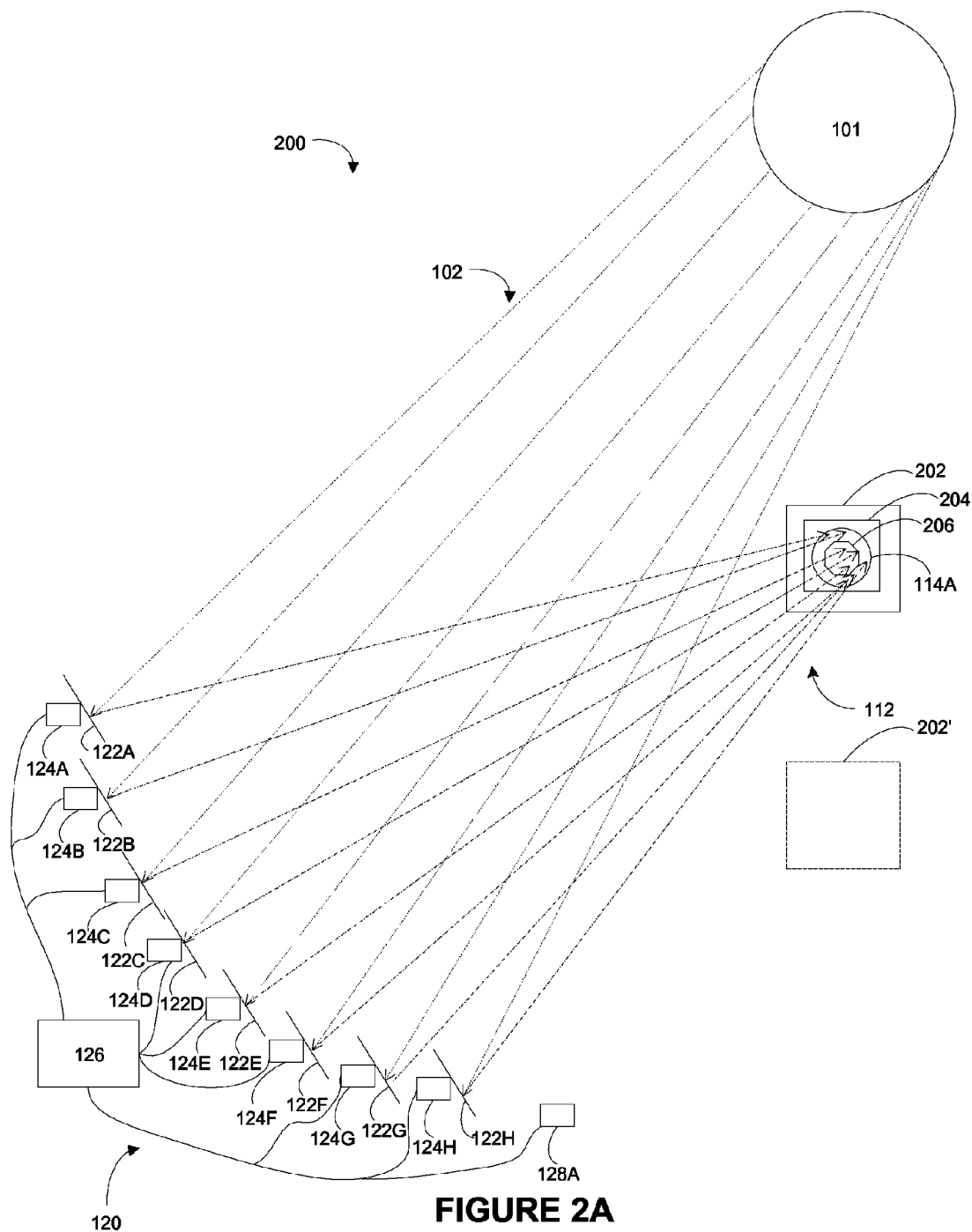
FIG. 2A is a schematic diagram of a vacuum molding system, in accordance with one embodiment of the present invention.
Figure 2B:
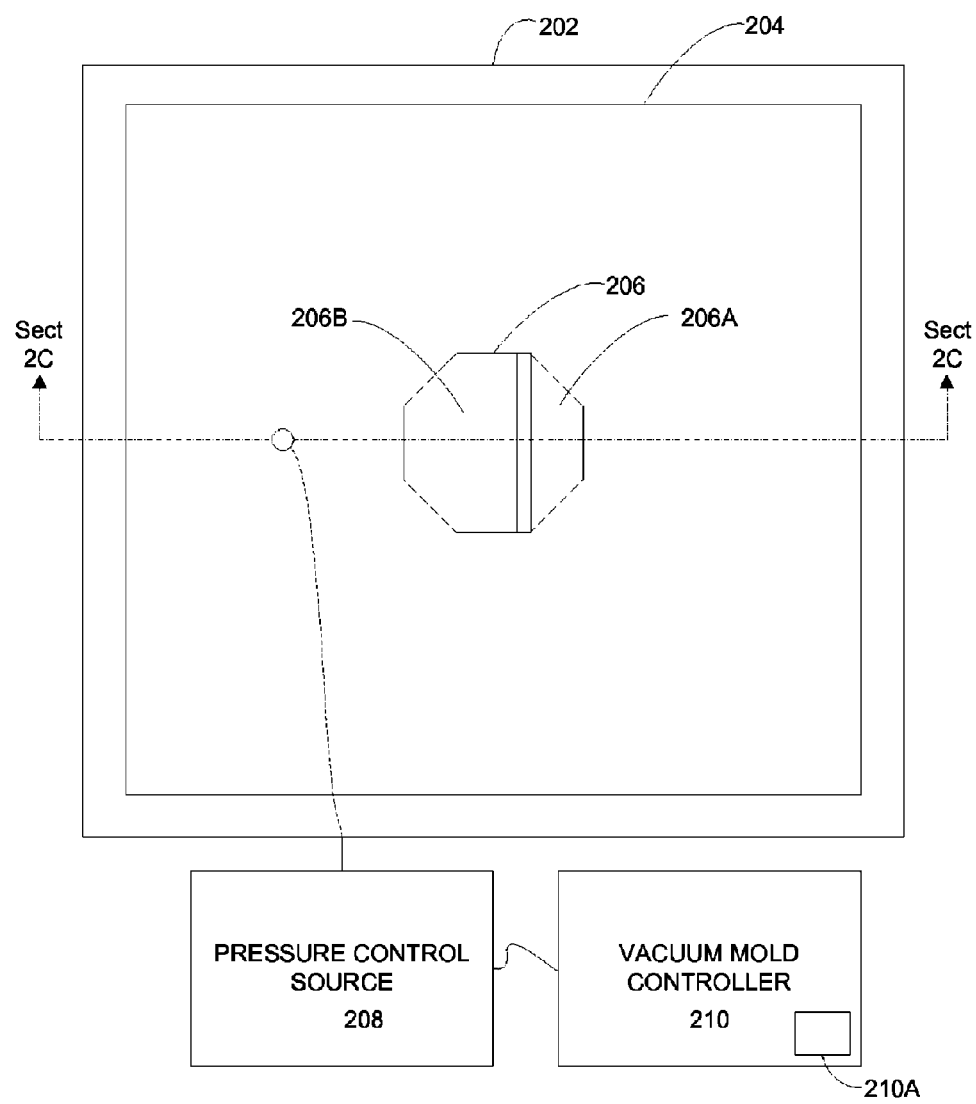
FIG. 2B is a detailed view of a schematic diagram of a vacuum mold, in accordance with one embodiment of the present invention.
Figure 2C:
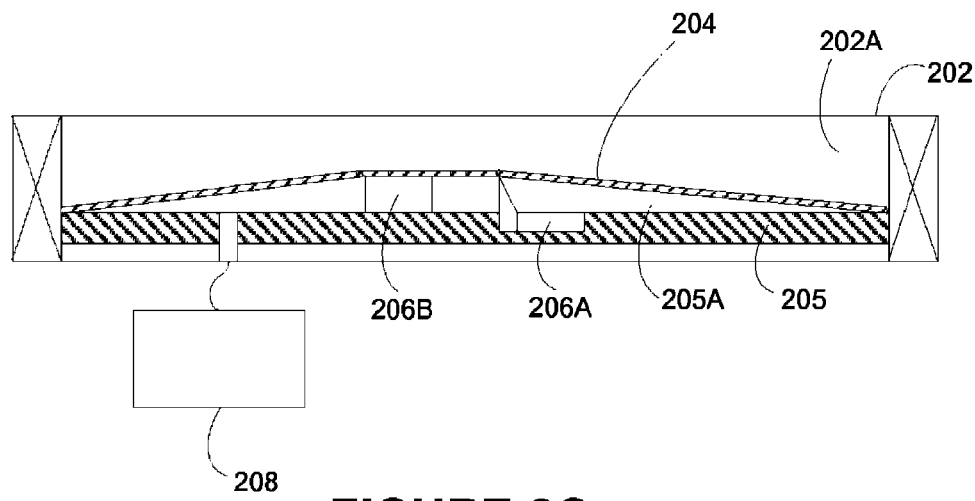
FIGS. 2C and 2D are sectional views of a schematic diagram of a vacuum mold, in accordance with one embodiment of the present invention.
Figure 2D:
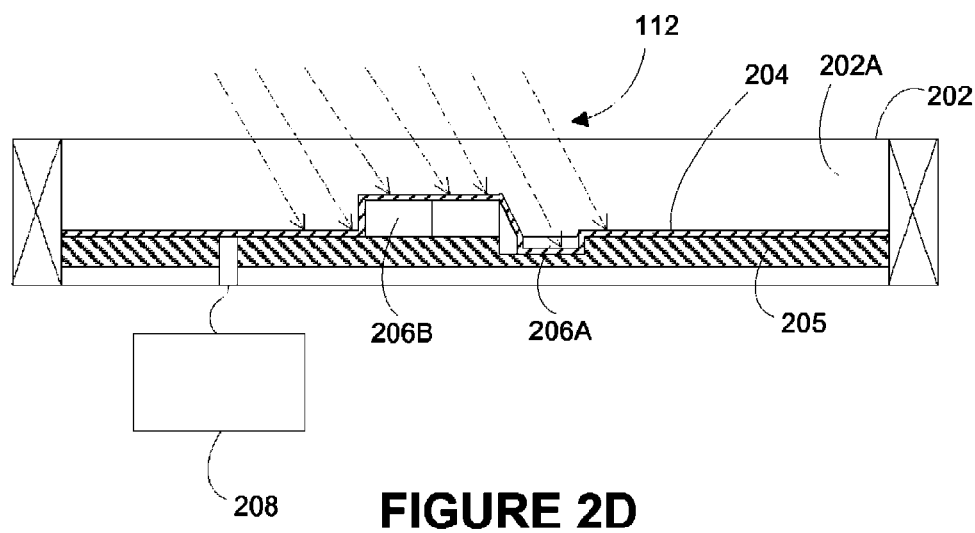

FIG. 2A is a schematic diagram of a vacuum molding system 200, in accordance with one embodiment of the present invention. FIG. 2B is a detailed view of a schematic diagram of a vacuum mold 202, in accordance with one embodiment of the present invention. FIGS. 2C and 2D are sectional views of a schematic diagram of a vacuum mold 202, in accordance with one embodiment of the present invention.

The vacuum mold system 200 includes a frame 202 that holds a sheet of plastic 204 over a mold shape 206. The frame 202 includes a base plate 205. The frame 202 seals the plastic sheet 204 to the base plate 205 at the perimeter of the base plate.

The mold shape 206 is secured to the back plate 205. The mold shape 206 can be concave 208A or convex 208B or combinations thereof.

A pressure control source 208 is coupled to the frame 202 and in some embodiments to the base plate 205. The pressure control source 208 reduces the pressure between the base plate 205 and the plastic sheet 204. The pressure control source 208 can be any suitable pressure control source such as a pump or other device that can reduce the pressure in the volume 205A between the base plate 205 and the plastic sheet 204 to less than a pressure outside the volume 205A between the base plate 205 and the plastic sheet 204. Conversely, the pressure control source 208 could increase the pressure on the plastic sheet 204 by increasing pressure to a volume 202B between an optional cover 202A and the plastic sheet.

A vacuum mold controller 210 is coupled to the pressure control source 208. The vacuum mold controller 210 includes operating software and logic 210A to control the relative pressures in the volume 205A between the base plate 205 and the plastic sheet 204 and the volume 202B between the optional cover 202A and the plastic sheet. The vacuum mold controller 210 can be included in or separate from and coupled to the heliostat controller 126.

Figure 2E:
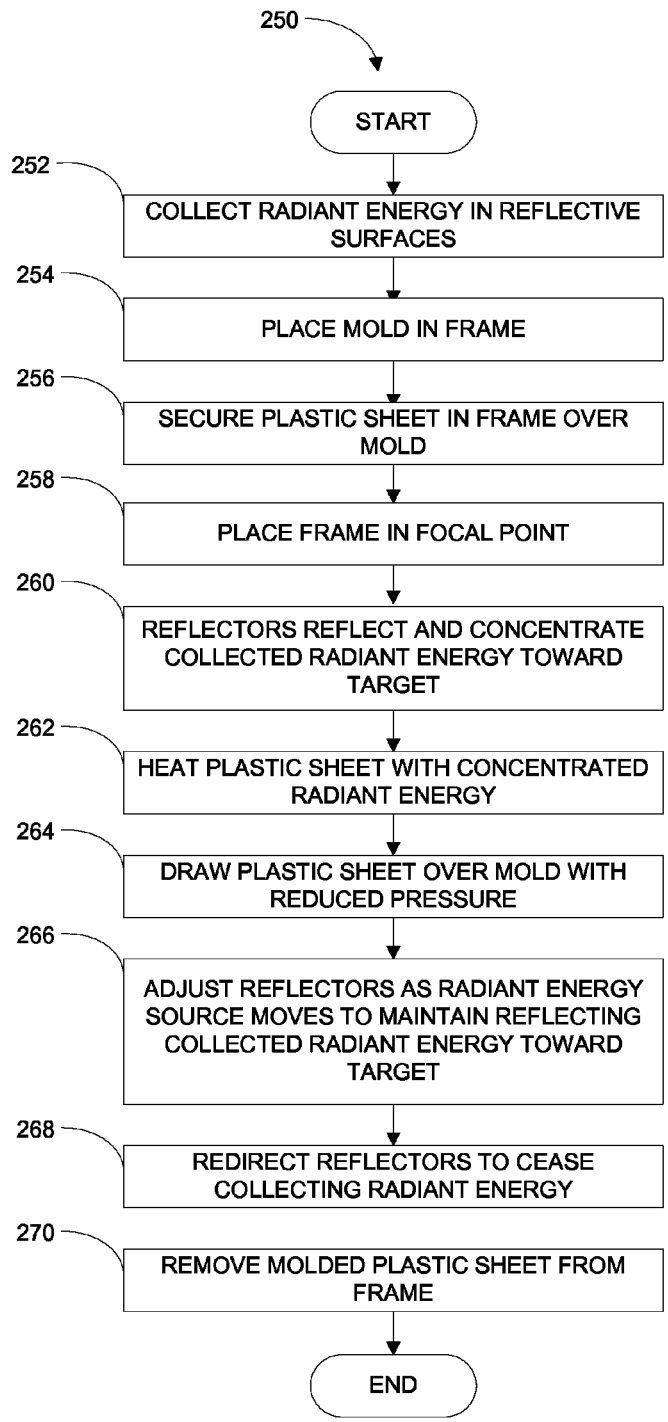
FIG. 2E is a flowchart diagram that illustrates the method operations performed in a solar vacuum molding method, in accordance with one embodiment of the present invention.

FIG. 2E is a flowchart diagram that illustrates the method operations 250 performed in a solar vacuum molding method, in accordance with one embodiment of the present invention. The operations illustrated herein are by way of example, as it should be understood that some operations may have sub-operations and in other instances, certain operations described herein may not be included in the illustrated operations. It should be understood that some operations may be enabled in computer readable software and logic. With this in mind, the method and operations 250 will now be described.

In an operation 252, the radiant energy 102 is collected in one or more of the reflective surfaces 122A-H of a heliostat such as shown in FIG. 1C above.

In an operation 254, the mold 206 is secured in the frame 202. The plastic sheet 204 is secured over the mold by the frame 202 in an operation 256. In an operation 258, the frame 202 is placed in the focal point 114A.

In an operation 260, the heliostat controller 126 steers selective ones of the reflective surfaces 122A-H so that the collected, reflected radiant energy 112 is directed toward and, optionally concentrated on the focal point 114A. In an operation 262, the plastic sheet 204 is heated by the reflected radiant energy 112.

In an operation 266, the plastic sheet 204 is drawn down onto and into the mold by the pressure differential between the volume 205A and volume 202B as described above. The pressure control source 208 can determine the pressure differential between the volume 205A and volume 202B.

In an operation 268, the heliostat controller 126 automatically tracks the radiant energy source 101 as it moves, relative to the heliostat 120 to maintain the reflected radiant energy 112 is directed toward the desired focal point 114A. In an operation 268, the heliostat controller 126 directs the reflective surfaces 122A-H away from the frame 202. The heliostat controller 126 can direct the reflective surfaces 122A-H such that the reflected radiant energy 112 is reflected in various different directions. Alternatively, the frame 202, can be moved to second location 202', away from the focal point 114A of the collected, reflected radiant energy 112.

In an operation 270, the molded plastic sheet 204 can be removed from the frame 202 and the method operations can end.

Figure 3A:
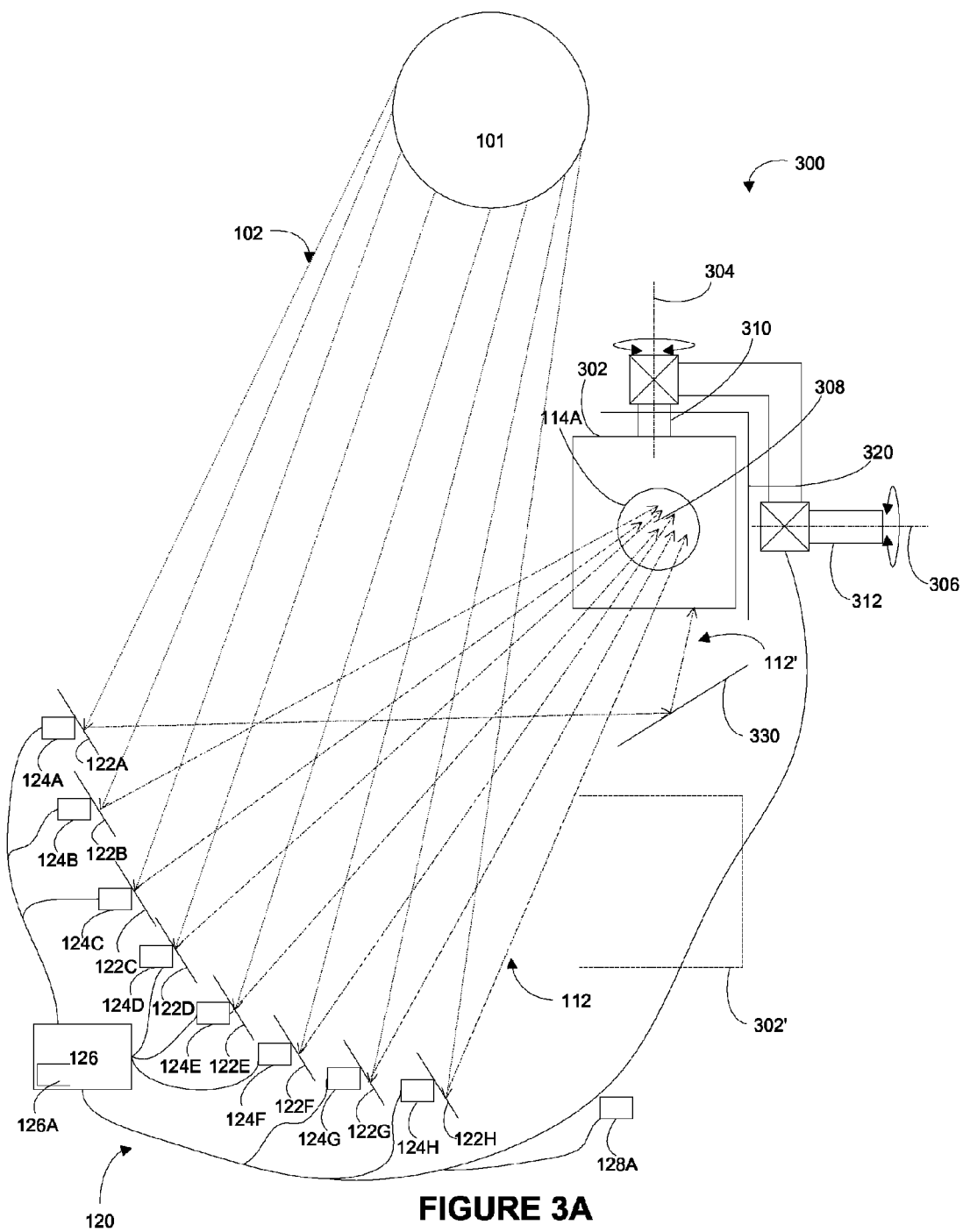
FIG. 3A is a schematic diagram of a solar rotational molding system, in accordance with one embodiment of the present invention.
Figure 3B:
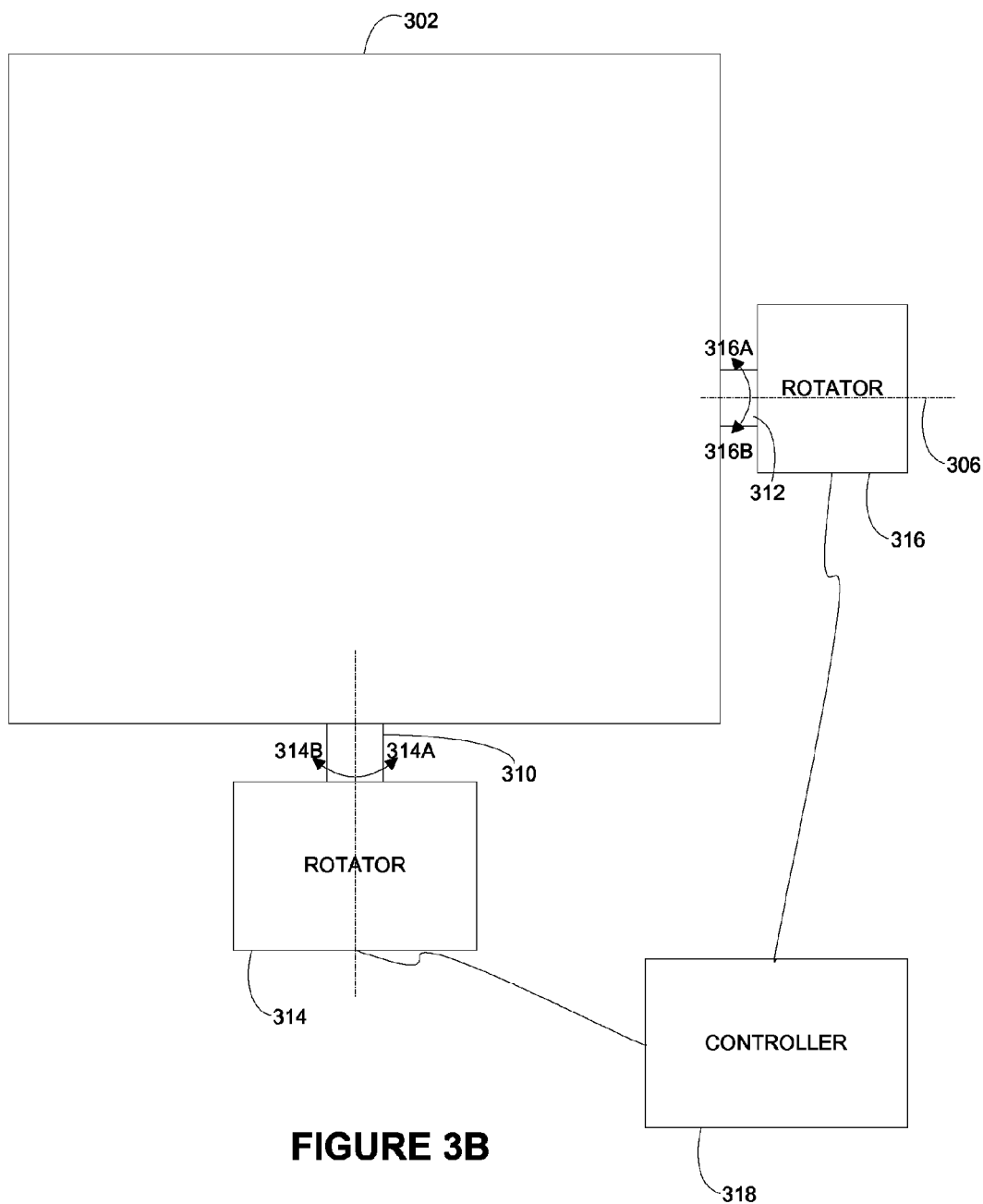
FIG. 3B is a more details view of a schematic diagram of a solar rotational molding system, in accordance with one embodiment of the present invention.

FIG. 3A is a schematic diagram of a solar rotational molding system 300, in accordance with one embodiment of the present invention. FIG. 3B is a more detailed view of a schematic diagram of a solar rotational molding system 300, in accordance with one embodiment of the present invention. FIG. 3D is a side sequence view a solar rotational molding 302, in accordance with one embodiment of the present invention.

The solar rotational molding system 300 includes a two-axis rotational mold 302. The two axis rotational mold 302 can rotate on at least two axes 304 and 306. It should be understood that the rotational mold 302 could also be rotational in a third axis 308 (e.g., perpendicular with the surface of the drawing) with minor modification to the concept. However to simplify the discussion and description only two axis 304 and 306 is discussed.

The solar rotational molding system 300 includes a first rotator 314 for rotating the mold 302 on the first axis 304 in directions 314A, 314B. The first rotator 314 is coupled to the mold 302 by the shaft 310. The solar rotational molding system 300 includes a second rotator 316 for rotating the mold 302 on the second axis 306 in directions 316A, 316B. The second rotator 316 is coupled to the mold 302 by the shaft 312. The first rotator 314 and the second rotator 316 can be any suitable rotational mechanism.

A heat shield structure 320 can optionally be included to substantially separate the first rotator 314 and the second rotator 316 from the reflected radiant energy 112. The heat shield structure 320 can be any suitable heat shield such as a wall or an actively cooled barrier. The heat shield structure 320 can also include heat decoupling links 322A, 322B that substantially thermally isolate the first rotator 314 and the second rotator 316 from the mold 302.

Figure 3C:
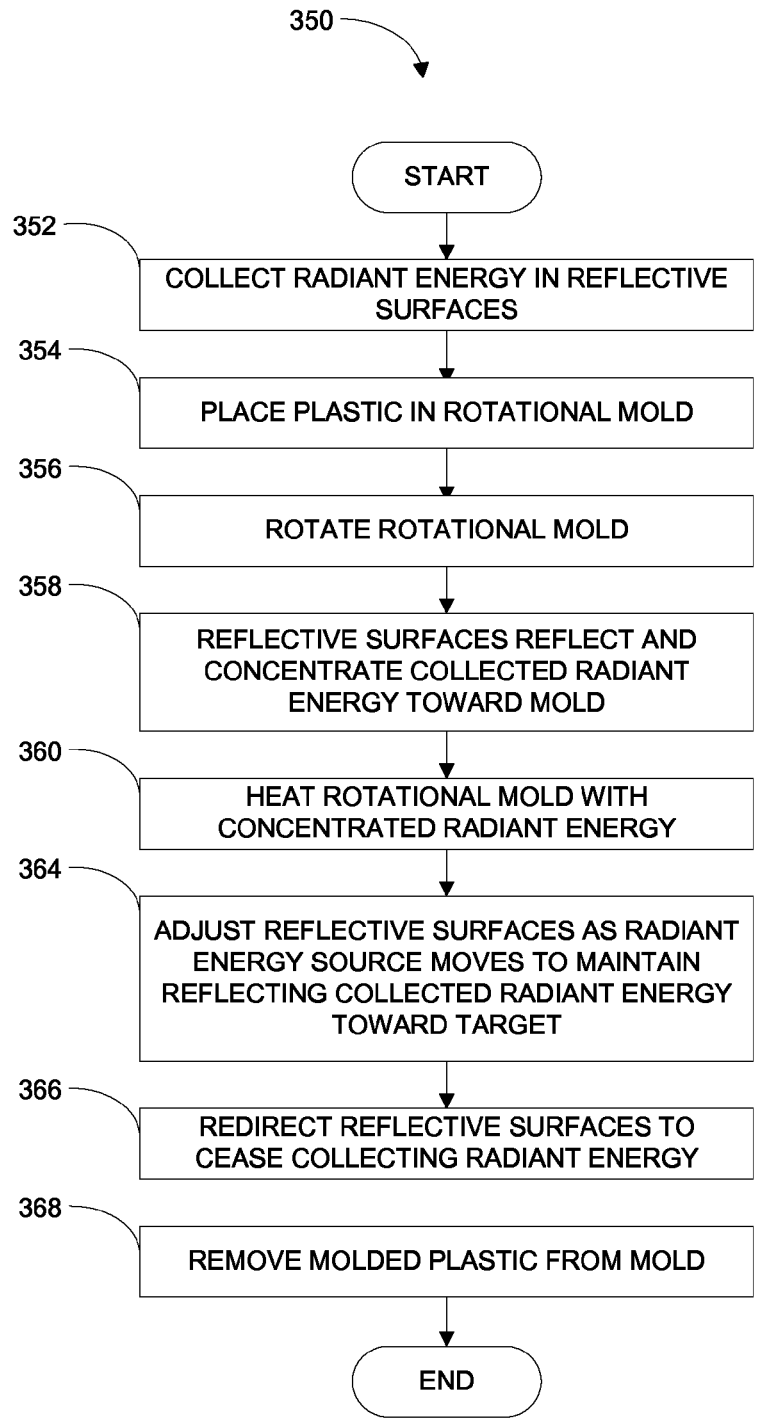
FIG. 3C is a flowchart diagram that illustrates the method operations performed in a solar rotational molding method, in accordance with one embodiment of the present invention.
Figure 3D:
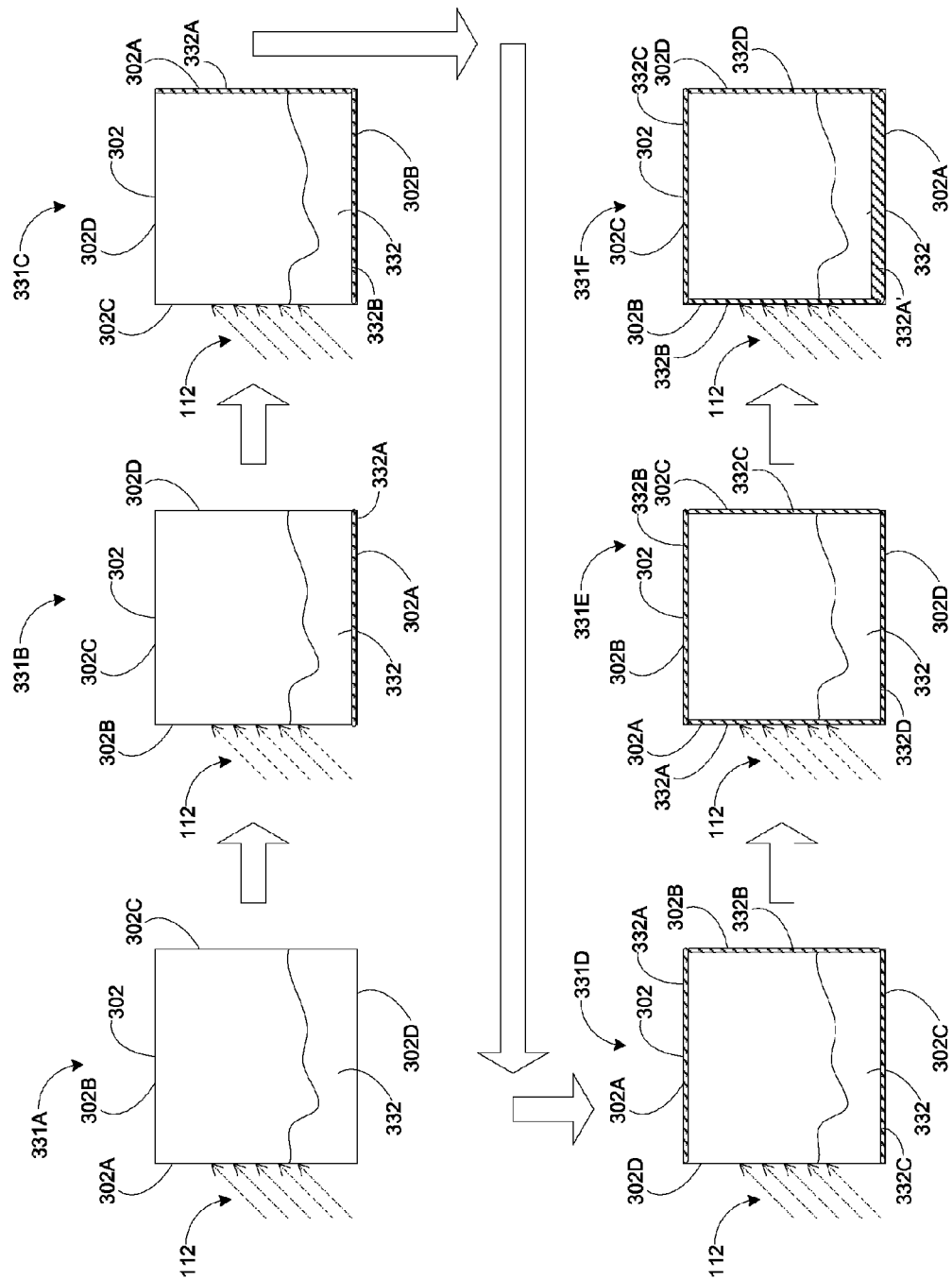
FIG. 3D is a side sequence view a solar rotational molding 302, in accordance with one embodiment of the present invention.
Figure 3E:
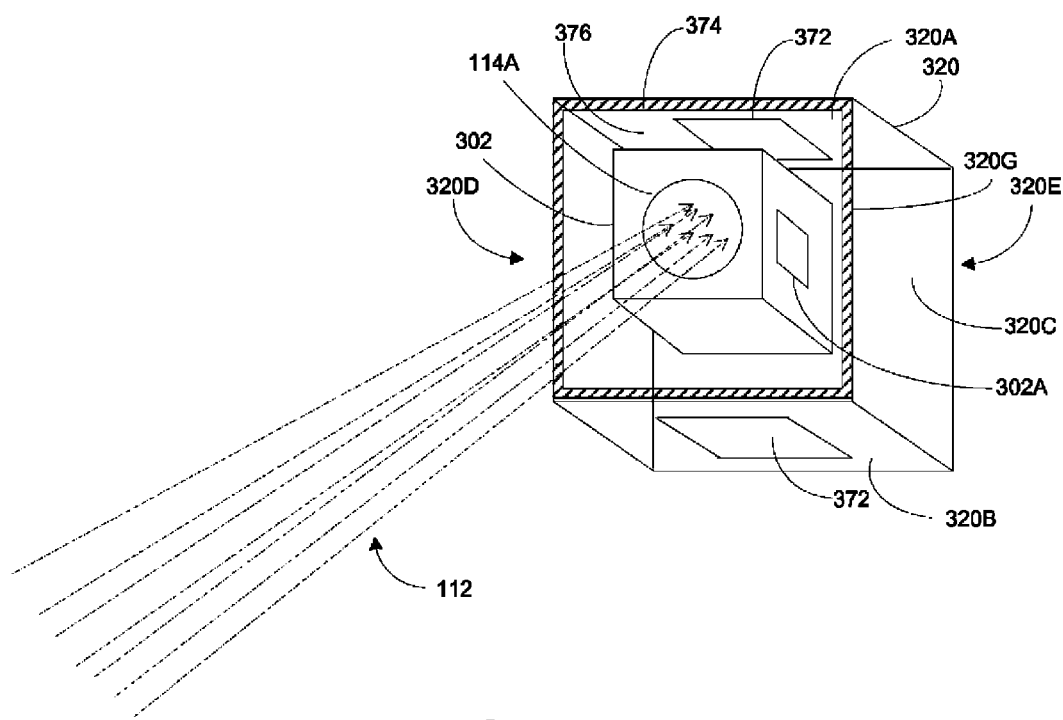
FIG. 3E is a schematic diagram of a shielded rotational mold in accordance with one embodiment of the present invention.

FIG. 3E is a schematic diagram of a shielded rotational mold in accordance with one embodiment of the present invention. The heat shield structure 320 can optionally, partially or fully encompass the mold 302. The heat shield structure 320 substantially isolate the mold from wind or other air movement to reduce the air cooling effects. By way of example, the heat shield structure 320 can cover all sides but one of the mold 302. The one open side 320G of the heat shield allows the uncovered side of the mold can be exposed to the reflected radiant energy 112 from the heliostat 120.

Alternatively, the heat shield structure 320 can fully encompass the mold 302 and the heat shield structure 320 can include a window or other suitable conduit in the side 320G. The window in side 320G can pass the reflected energy 112 through to impinge on the mold 302.

The heat shield structure 320 can also include an insulating layer 374 to prevent thermal energy from escaping. The heat shield structure 320 can also include a thermal reflecting layer 376 on the inner surfaces to reflect thermal energy radiating from the mold 302 back toward the mold. The heat shield structure 320 can also include mirrors on the inner surface of the heat shield structure (e.g., behind the mold 302). The mirrors on the inner surface of the heat shield structure 320 can be angled such that any of the reflected energy 112 which does not impinge on the mold 302 can be reflected directly back to the mold.

The heat shield structure 320 can also include one or more vents 372 to allow selectively venting the thermal energy within the heat shield structure. By way of example the venting the thermal energy within the heat shield structure may be desirable to cool or otherwise regulate the temperature of the mold 302.

FIG. 3C is a flowchart diagram that illustrates the method operations 350 performed in a solar rotational molding method, in accordance with one embodiment of the present invention. The operations illustrated herein are by way of example, as it should be understood that some operations may have sub-operations and in other instances, certain operations described herein may not be included in the illustrated operations. It should be understood that some operations may be enabled in computer readable software and logic. With this in mind, the method and operations 350 will now be described.

In an operation 352, the radiant energy 102 is collected in one or more of the reflective surfaces 122A-H of a heliostat such as shown in FIG. 1C above.

In an operation 354, a quantity of plastic powder or pellets 332 or other suitable moldable material is placed in the mold 302. In an operation 356, the rotational mold 302 is rotated in at least one direction 314A, 314B, 316A, 316B.

In an operation 358, the mold 302 is placed in the focal point 114A and at least a portion of the rotational mold is heated by the reflected radiant energy. Heating is via radiant energy (the concentrated reflected radiant energy 112) and cooling is by convection to the surrounding air. Therefore, it can be useful to slow or hold a portion of the mold 302 for best exposure to the reflected radiant energy 112. In several minutes, the exposed portion of the mold 302 can heat to between about 300 and about 450 degrees F. However, the other 5 sides (of a nominal cube shaped mold 302) are cooling slowly by convection. Heating and cooling are asymmetrical as they occur at different rates. Radiant heating is fast and efficient, whereas convection to air is slow and inefficient.

The incident angle at which the reflected radiant energy 112 impinges on the surface of the mold 302 is important for best heat transfer. If the mold 302 is rotating, the best angle only occurs for relatively small portion of that rotation. The rotational molding system 300 can hold the mold 302 so that a selected portion of the surface of the mold is exposed at the optimum incident angle and heated to the desired temperature, then the next portion of the surface of the mold is exposed to the reflected radiant energy 112.

A typical rotational mold spins continuously in a hot bath of oven-heated air. The rate of rotation of the rotational mold 302 can vary during the molding process. By way of example, the mold 302 may be heated more efficiently by heating one portion 302A of the mold for a longer period than another portion 302B of the mold. Thus when the reflected energy 112 impinges on that portion 302A of the mold 302, the rate of rotation can slow or even stop momentarily, as needed. Placing the mold 302 in the focal point 114A can also include the heliostat controller 126 steering selective ones of the reflective surfaces 122A-H so that the collected, reflected radiant energy 112 is directed toward and, optionally concentrated on the focal point 114A.

Because the incident angle of the reflected radiant energy 112 and the relative position of the mold 302 are controllable, it is possible to pre-heat difficult (i.e., complex) portions 302A-D of the mold to a desired temperature (e.g., just below at or slightly above the plastic fusion temperature). Traditional rotational molding processes do not allow selective heating and selected portions of the mold 302.

The plastic powder or pellets 332 used in rotational molding can fall to the bottom of the mold 302, therefore, and with reference to FIG. 3D, it may be beneficial to rotate the most recently heated portion 302A of the mold to the bottom position as shown in orientation 331B such that plastic powder covers that portion 302A and has an opportunity to form a layer 332A on the inner surface on that portion 302A of the mold. Subsequent heating and rotation causes the remaining inner surfaces of the most recently heated portion 302A-302D to have respective layers 332A-332D of plastic form thereon. Continued heating and layer formation cycles will result in thicker plastic layer 332A' formation.

Heating opposite portions (e.g. 302A and 302C and 302B and 302D) of the mold 302 in close sequence can more evenly heat the mold. By way of example, and with reference to FIG. 3D, if a first portion 302A of the mold 302 is heated first and then an adjacent portion 302B is heated allowing the first portion 302A to rotate to the bottom position (e.g., orientation 331B), then the third orientation of the mold should be such that the portion opposite 302C the first portion 302A is heated (e.g., as shown in orientation 331C). In this manner the most opposite portions of the mold 302 are heated.

Referring again to FIG. 3C, and in an operation 360, the mold 302 is heated by the reflected radiant energy 112.

In an operation 364, the heliostat controller 126 automatically tracks the radiant energy source 101 as it moves, relative to the heliostat 120 to maintain the reflected radiant energy 112 is directed toward the desired focal point 114A. In an operation 366, the heliostat controller 126 directs the reflective surfaces 122A-H away from the mold 302. The heliostat controller 126 can direct the reflective surfaces 122A-H such that the reflected radiant energy 112 is reflected in various different directions. Alternatively, the mold 302, can be moved to second location 302', away from the focal point 114A of the collected, reflected radiant energy 112.

In an operation 368, the molded plastic can be removed from the mold 302 and the method operations can end.

More even plastic deposits if step heat the portions of the mold 302 to about the plastic fusion temperature (e.g., for HDPE at about 280 to about 300 degree F.). Any difficult to heat portions of the mold 302 may be overheated to about 100 degrees F. above the HDPE fusion temperature. These portions of the mold, once heated are not dropped to the bottom position for any extended period, in order to avoid overly thick plastic build-up due to the high level of thermal energy stored in the overheated portion of the mold 302. Once the one or more difficult to heat portions of the mold 302 are overheated, the mold can be placed into a substantially constant rotation. This more evenly distributes the plastic around the internal surfaces of the mold 302 by limiting the amount of time the plastic is exposed to the overheated portions of the mold.

Figure 4A:
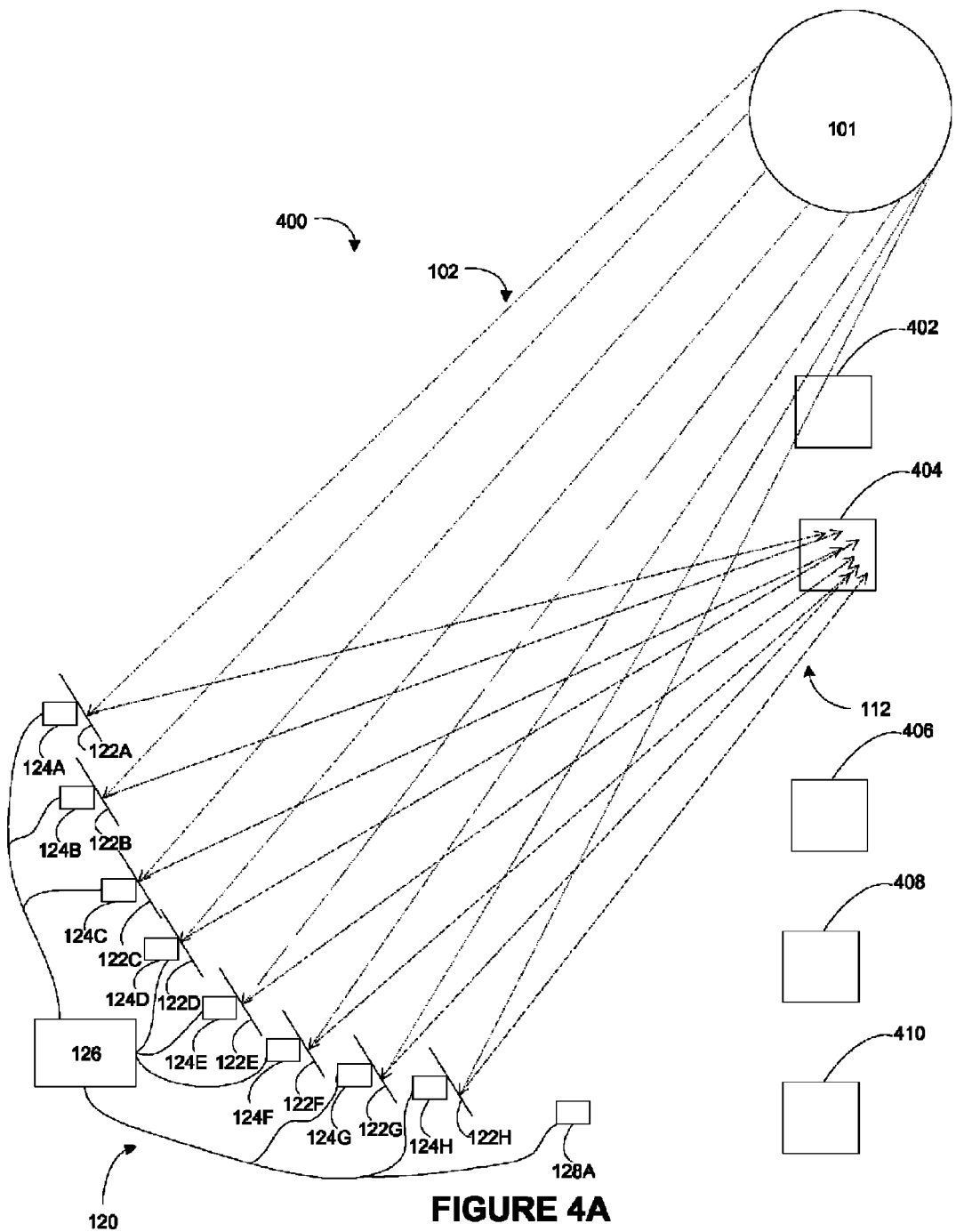
FIG. 4A is a schematic diagram of a multiple target plastic molding system, in accordance with one embodiment of the present invention.

FIG. 4A is a schematic diagram of a multiple target plastic molding system 400, in accordance with one embodiment of the present invention. The multiple target plastic molding system 400 is similar to the systems 200, 300 described above, however also includes multiple molds 402-410. The molds 402-410 can include vacuum molds and rotational molds.

Figure 4B:
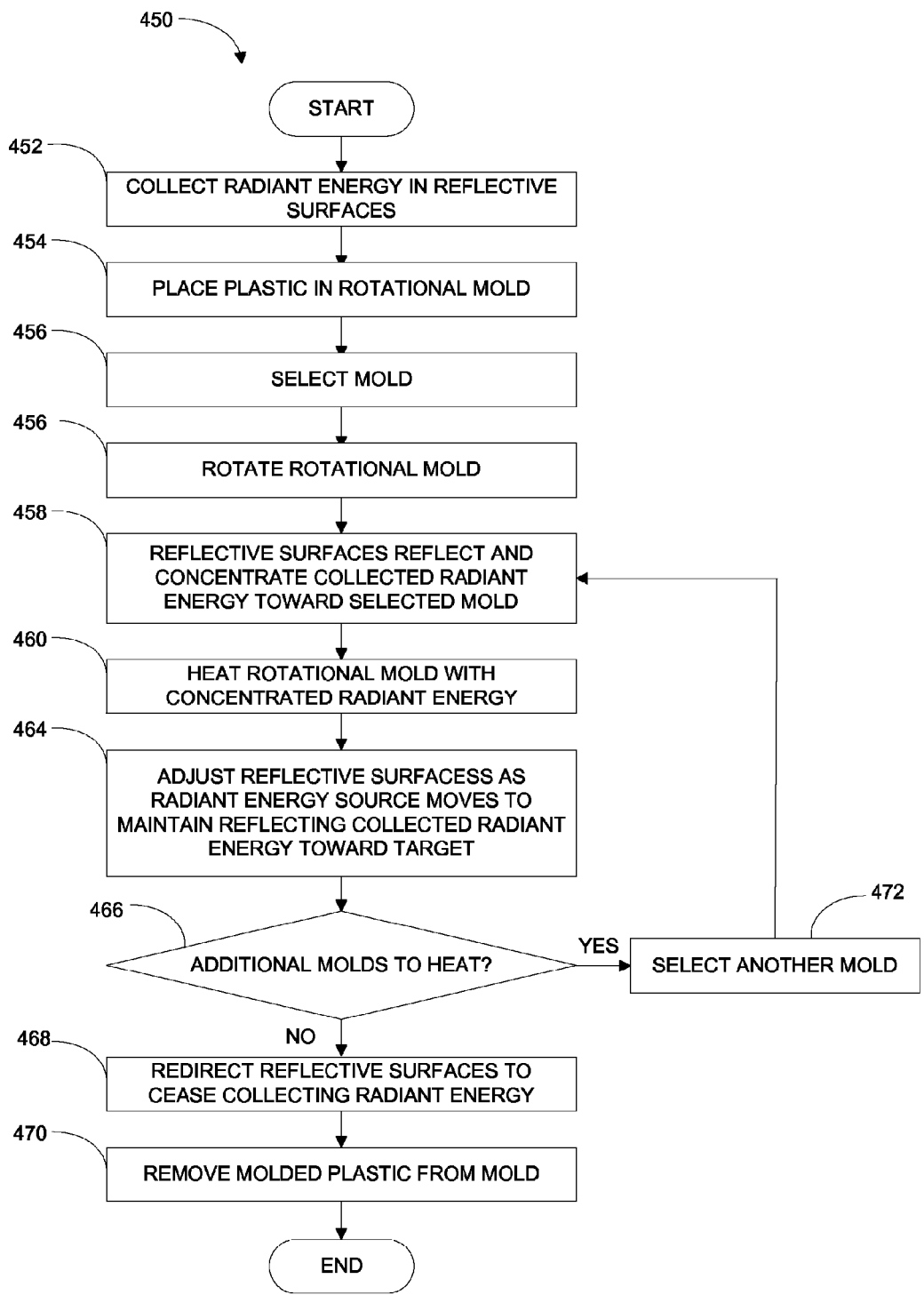
FIG. 4B is a flowchart diagram that illustrates the method operations performed in a multiple target plastic molding method, in accordance with one embodiment of the present invention.

FIG. 4B is a flowchart diagram that illustrates the method operations 450 performed in a multiple target plastic molding method, in accordance with one embodiment of the present invention. The operations illustrated herein are by way of example, as it should be understood that some operations may have sub-operations and in other instances, certain operations described herein may not be included in the illustrated operations. It should be understood that some operations may be enabled in computer readable software and logic. With this in mind, the method and operations 450 will now be described.

In an operation 452, the radiant energy 102 is collected in one or more of the reflective surfaces 122A-H of a heliostat such as shown in FIG. 1C above.

In an operation 454, one or more of the molds 402-410 is loaded with the plastic source material (e.g., plastic sheet for a vacuum mold and plastic powder and/or pellets for a rotational mold). In an operation 456, a first mold is selected.

In an operation 458, the heliostat controller 126 steering selective ones of the reflective surfaces 122A-H so that the collected, reflected radiant energy 112 is directed toward and, optionally concentrated on the selected mold.

In an operation 460, the selected mold is heated by the reflected radiant energy 112.

In an operation 464, the heliostat controller 126 automatically tracks the radiant energy source 101 as it moves, relative to the heliostat 120 to maintain the reflected radiant energy 112 is directed toward the desired focal point 114A.

In an operation 466, a decision is made whether to continue to another one of the molds 402-410. If in operation 466, the decision is made to end, then the method operations continue in an operation 468.

In operation 468, the heliostat controller 126 directs the reflective surfaces 122A-H away from the selected mold. The heliostat controller 126 can direct the reflective surfaces 122A-H such that the reflected radiant energy 112 is reflected in various different directions (e.g., also away from the other molds 402-410). Alternatively, the selected mold, can be moved to second location, away from the focal point 114A of the collected, reflected radiant energy 112. In an operation 470, the molded plastic can be removed from the selected mold and the method operations can end.

If in operation 466, the decision is to select another one of the molds 402-410, then the method operations continue in operation 472. In operation 472, another mold 402-410 is selected. And the method operations continue in operation 458 described above.

One problem in traditional rotational mold manufacturing processes is hard-to-heat portions of the mold. Some portions of the mold require extra heating, some portions of the mold requires less heating and even cooling in some instances. As a result, the typical rotational molds are very complex requiring varying thicknesses, heatsinks, insulation and other structures to be added to the mold to provide the desired heat absorption.

The solar rotational molding system 300 allows dynamic selection and adjustment of the amount of reflected radiant energy 112 impinging on the selected portion of a surface of the mold 302. Pinpoint control of mold surface temperature regions (e.g. a "soccer ball" polyhedron w/20+ faces) can be achieved. The amount of reflected radiant energy 112 impinging on the selected surface of the mold 302 can be increased or decreased by either of or a combination of adjusting the amount or concentration or locations (on the surface of the mold) of the reflected energy or by adjusting the time the selected surface is exposed to the reflected energy. The benefits of real-time temperature monitoring and per-face adjustment include simplified, lower cost molds, reduced cycle times, better quality molded products, more flexible manufacturing process accommodating more complex products as contrasted to traditional rotational molding processes and systems. The sensors 128A, 128B allow the controller 126 and the software 126A to determine the instantaneous intensity of the reflected energy 112 and the precise location of a selected portion of the mold 302 relative to the focal point 114A.

As described above, the rate of heating the rotational mold 302 can be adjusted dynamically, in real time, as needed for each portion of the mold. By way of example independently controlled motors 124A-H and rotators 314, 316, allows for asymmetrical heating of surface of the mold 302. An increase in dwell (e.g., temporarily stop or slow rotation) of the surface of the mold 302 exposed to the reflected radiant energy 112 can increase the heating of that surface. Similarly, a decrease in dwell (e.g., temporarily accelerate rotation) of the surface of the mold 302 exposed to the reflected radiant energy 112 can decrease the heating of that surface or even allow that surface to cool as the reflected radiant energy 112 is very directional. Increasing or decreasing the amount of reflected radiant energy 112 reflected from the heliostat system 120 can also dynamically increase or decrease a selected surface of the mold 302. The controller 126 detects a location and temperature of each portion of the mold using the sensors 128A. 128B.

A user can also manually adjust the amount of reflected radiant energy 112 impinging on the selected surface of the mold 302. The respective heating of each portion of the mold can be part of a computer aided design of the product being formed in the mold 302. The controller 126 can also include software and logic 126A that can adapt in real time based on feedback from sensors 128A, 128B to maintain desired setpoint temperature on each portion of the mold 302.

The mold 302 can also include a dual layer mold cooling process. A cooling sleeve can be temporarily inserted into a portion of the mold 302. The cooling sleeve can be a relatively thin walled, as compared to the wall thickness of the mold 302. By way of example, the cooling sleeve can be about 0.090 inch thick sheet metal or other equivalent heat absorbent material. It should be understood that the 0.090 inch wall thickness is merely exemplary and the cooling sleeve wall thickness can be any suitable thickness as needed based on the cooling capacity needed and the material of the cooling sleeve. The cooling sleeve fits inside the mold 302. The cooling sleeve fits in close contact with the inner surfaces of the mold 302. The cooling sleeve can be formed from a heat conductive material (e.g., metal (steel, aluminum, coppers, alloys and combinations thereof) or other suitable heat conductive materials).

During the cooling phase, the mold 302 can be opened and the cooling sleeve is extracted and a new cooling insert installed. Additional plastic powder or pellets can also be added. The cooling sleeve can be allowed to cool passively and/or actively with fans and/or some coolant (e.g., water spray) until the plastic part is cooled sufficiently to allow extraction from the mold 302. The cooling sleeve allows the mold 302 and support hardware to remain hot and thus decoupling the plastic cooling process from cooling the mold 302. This saves the energy and time of reheating the mold 302 as well as allowing the mold support structure, surrounding air and enclosure structure to stay at higher temperatures than possible if the mold was cooled in situ'.

The rotational molding system 300 can maximize solar heating efficiency. Traditional rotational molds have large armatures that hold and rotate the mold. This is not ideal for solar powered rotational molding, as these armatures periodically interrupt the reflected radiant energy 112 that is heating the mold. A rotational mold can be designed such that the armatures that support the mold never interrupt the incident reflected radiant energy 112. This improves the solar heating efficiency as less heat would be lost in heating the rotational mold armatures.

The rotational molding system 300 can also include one or more reflecting surfaces 330. The one or more reflecting surfaces 330 allowing more direct heating of portions of the mold 302 in contact with the plastic. As discussed above, only a first portion of the mold 302 that is exposed to the reflected radiant energy 112 is heated by heliostat 120. As plastic can sit on the bottom of the mold 302, to deposit a maximum amount of plastic (or to deposit that plastic most rapidly) the first portion must be heated and then move the first portion to the bottom position for plastic to fall onto it.

Alternatively, the mold 302 can be raised and/or a reflecting surface 330 can be placed below the mold. This reflecting surface 330 can reflect all or a portion of the reflected radiant energy 112 to the bottom surface of the mold 302. This may decrease the cycle times, as plastic can be directly heated by the reflected radiant energy 112 thermally transfers and provides a more precise control of plastic deposition As described above the systems 200, 300 and 400 a simpler in both construction and operation that traditional rotational and vacuum molding systems and processes. Traditional rotational molding systems are physically massive, expensive from both material and energy perspectives. Traditional rotational molding systems are expensive to construct and/or move and they require a relatively large building to house the oven.

In contrast, the above described heliostat-based systems 200, 300 and 400 require much less materials, buildings and energy due to the relative lightweight nature of the heliostat energy source 120. As a result the above described heliostat-based systems 200, 300 and 400 are substantially cheaper capital cost to deploy and substantially cheaper in energy costs to operate as the radiant energy source 101 is available in almost any locale. Thus very little energy delivery infrastructure is required for the heliostat-based systems 200, 300 and 400.

In contrast, a traditional rotational and vacuum molding system requires extensive sources of electrical power and/or fossil fuels to heat the oven in which the mold is heated. This extensive demand for electrical power and/or fossil fuels requires extensive infrastructure to deliver the power and/or fossil fuels. The required infrastructure includes powerlines, pipelines, railroads, roads, trucks, etc. that are not required by the above described heliostat-based systems 200, 300 and 400. Thus the heliostat-based systems 200, 300 and 400 can be deployed in locales without the infrastructure required to support traditional rotational and vacuum molding systems. As a result the heliostat-based systems 200, 300 and 400 allow plastic product production in locales not accessible by traditional rotational and vacuum molding systems.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 5:
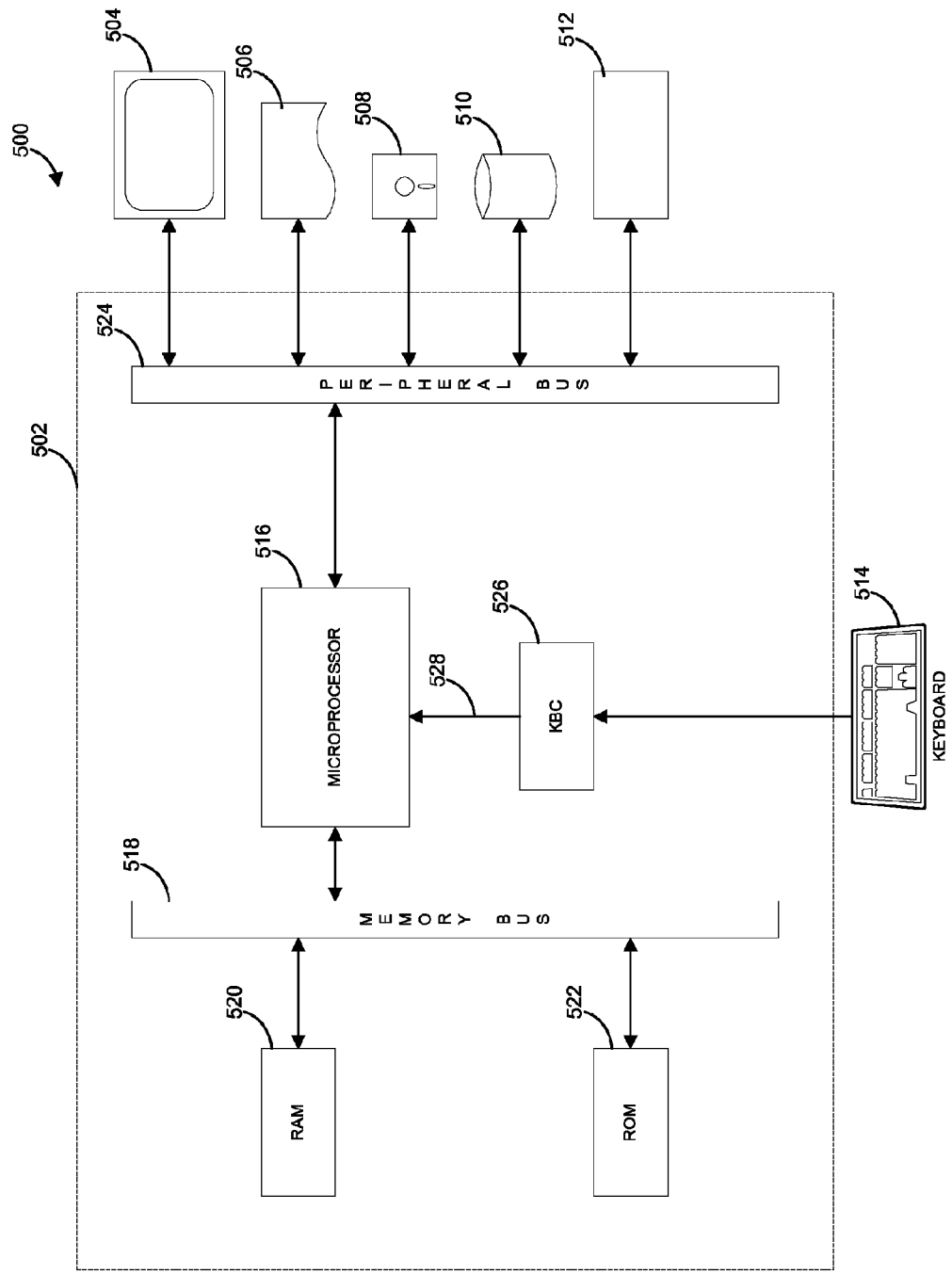
FIG. 5 is a block diagram of an exemplary computer system for carrying out the processing according to the invention.

FIG. 5 is a block diagram of an exemplary computer system 500 for carrying out the processing according to the invention. The computer system 500 can include or be part of the controller 126 described above. The computer system 500 includes a digital computer 502, a display screen (or monitor) 504, a printer 506, a floppy disk drive 508, a hard disk drive 510, a network interface 512, and a keyboard 514. The digital computer 502 includes a microprocessor 516, a memory bus 518, random access memory (RAM) 520, read only memory (ROM) 522, a peripheral bus 524, and a keyboard controller (KBC) 526. The digital computer 502 can be a personal computer (such as an IBM compatible personal computer, a Macintosh computer or Macintosh compatible computer), a workstation computer (such as a Sun Microsystems or Hewlett-Packard workstation), or some other type of computer or programmable industrial control system (i.e. Programmable Logic Controller (PLC)).

The microprocessor 516 is a general purpose digital processor, which controls the operation of the computer system 500. The microprocessor 516 can be a single-chip processor or can be implemented with multiple components. Using instructions retrieved from memory, the microprocessor 516 controls the reception and manipulation of input data and the output and display of data on output devices.

The memory bus 518 is used by the microprocessor 516 to access the RAM 520 and the ROM 522. The RAM 520 is used by the microprocessor 516 as a general storage area and as scratch-pad memory, and can also be used to store input data and processed data. The ROM 522 can be used to store instructions or program code followed by the microprocessor 516 as well as other data.

The peripheral bus 524 is used to access the input, output, and storage devices used by the digital computer 502. In the described embodiment, these devices include the display screen 504, the printer device 506, the floppy disk drive 508, the hard disk drive 510, and the network interface 512. The keyboard controller 526 is used to receive input from keyboard 514 and send decoded symbols for each pressed key to microprocessor 516 over bus 528.

The display screen 504 is an output device that displays images of data provided by the microprocessor 516 via the peripheral bus 524 or provided by other components in the computer system 500. The printer device 506, when operating as a printer, provides an image on a sheet of paper or a similar surface. Other output devices such as a plotter, typesetter, etc. can be used in place of, or in addition to, the printer device 506. The floppy disk drive 508 and the hard disk drive 510 can be used to store various types of data. The floppy disk drive 508 facilitates transporting such data to other computer systems, and hard disk drive 510 permits fast access to large amounts of stored data.

The microprocessor 516 together with an operating system operate to execute computer code and produce and use data. The computer code and data may reside on the RAM 520, the ROM 522, or the hard disk drive 510. The computer code and data could also reside on a removable program medium and loaded or installed onto the computer system 500 when needed. Removable program media include, for example, CD-ROM, PC-CARD, floppy disk, flash memory, optical media and magnetic tape.

The network interface 512 is used to send and receive data over a network connected to other computer systems. An interface card or similar device and appropriate software implemented by the microprocessor 516 can be used to connect the computer system 500 to an existing network and transfer data according to standard protocols. The network interface 512 can also be used to provide remote control and monitoring and Internet connectivity so that the systems 200, 300, 400 can be monitored and controlled remotely. Thus, allowing multiple systems 200, 300, 400 to be controlled from a central control room or even remotely from many thousands of miles away.

The keyboard 514 is used by a user to input commands and other instructions to the computer system 500. Other types of user input devices can also be used in conjunction with the present invention. For example, pointing devices such as a computer mouse, a track ball, a stylus, or a tablet can be used to manipulate a pointer on a screen of a general-purpose computer.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A thermal manufacturing system comprising: a heliostat including: an at least one reflecting surface; a steering mechanism coupled to the at least one reflecting surface and capable of directing at least a first portion of the at least one reflecting surface toward a first one of a plurality of selectable focal points; and a controller; and at least one mold located in a second one of the plurality of selectable focal points, the at least one mold including at least one of a vacuum mold or a rotational mold; wherein the rotational mold includes an inner shaping surface and is coupled to a rotation mechanism.

2. The system of claim 1, further comprising a pressure control source coupled to the at least one mold.

3. The system of claim 1, wherein the at least one mold comprises the rotational mold.

4. The system of claim 3, wherein the rotation mechanism is a two axis rotation mechanism.

5. The system of claim 3, wherein the rotation mechanism is a continuous rotation mechanism.

6. The system of claim 3, wherein the rotation mechanism is a variable rotation rate rotation mechanism.

7. The system of claim 3, wherein the rotation mechanism is a selected rotation position mechanism.

8. The system of claim 1, further comprising a heat shield structure.

9. The system of claim 8, wherein the heat shield structure substantially encloses the at least one mold.

10. The system of claim 1, wherein the heliostat includes at least one of a plurality of flat reflective surfaces or a plurality of curved reflective surfaces.

11. The system of claim 1, wherein the at least one mold includes a plurality of molds, wherein each one of the plurality of molds being located in corresponding one of the plurality of selectable focal points.

12. The system of claim 1, wherein the controller includes software and hardware including: computer executable logic for loading a quantity of moldable material in the at least one mold; computer executable logic for placing the at least one mold in the selected one of the plurality of focal points; and computer executable logic for directing reflected, concentrated radiant energy on a selected portion of the at least one mold.

13. The system of claim 12, wherein the controller further includes software and hardware including: computer executable logic for heating the selected portion of the at least one mold with the reflected, concentrated radiant energy; computer executable logic for removing the at least one mold from the focal point of the heliostat; and computer executable logic for removing a molded product from the at least one mold.

14. The system of claim 1, wherein the at least one reflecting surface includes a plurality of flat reflective surfaces or a plurality of curved reflective surfaces and wherein the rotation mechanism is a two axis rotation mechanism.

\* \* \* \* \*